United States Patent [19]

Clikeman et al.

[11] Patent Number: 4,650,824

[45] Date of Patent: Mar. 17, 1987

[54] INTERPOLYMERS OF POLYVINYL CHLORIDE AND POLYIMIDES

[75] Inventors: Richard R. Clikeman, Washington Crossing; Douglas S. Cinoman, Levittown; Ernst D. Weiler, Ambler, all of Pa.

[73] Assignee: Rohm and Haas Co., Philadelphia, Pa.

[21] Appl. No.: 857,898

[22] Filed: Apr. 30, 1986

[51] Int. Cl.[4] .............................................. C08L 79/08
[52] U.S. Cl. .................................... 524/457; 524/458; 525/66; 525/205; 525/317; 525/419; 525/422; 525/426

[58] Field of Search ................. 525/73, 205, 318, 422, 525/426, 66, 282, 317, 419; 524/457, 458

[56] References Cited

U.S. PATENT DOCUMENTS

| | | | |
|---|---|---|---|
| 3,639,509 | 2/1972 | Zentner et al. | 525/205 X |
| 4,130,527 | 12/1978 | Miller et al. | 524/804 X |
| 4,255,322 | 3/1981 | Kopchik | 525/205 X |
| 4,458,046 | 7/1984 | Hornbaker et al. | 524/399 |

*Primary Examiner*—Theodore E. Pertilla
*Attorney, Agent, or Firm*—John E. Taylor, III

[57] ABSTRACT

Interpolymers made by polymerizing vinyl chloride monomer in the presence of a polyimide show excellent heat distortion resistance and processing characteristics.

21 Claims, No Drawings

INTERPOLYMERS OF POLYVINYL CHLORIDE AND POLYIMIDES

This invention relates to vinyl chloride polymers, and particularly to polymerization of vinyl chloride in the presence of a polyimide, and the resulting polyvinyl chloride/polyimide interpolymers.

BACKGROUND OF THE INVENTION

Vinyl chloride polymers (PVC) are often blended with other polymers to produce compositions with superior physical properties. For example Kopchik, U.S. Pat. No. 4,255,322, discloses melt blending of imide polymers with PVC to improve the heat-distortion resistance of the PVC. Unfortunately, PVC imposes certain constraints on the melt blending process, because it degrades readily at elevated temperatures. High temperatures or long processing times at moderate temperatures introduce yellowing and other visible signs of thermal degradation, and latent degradation problems such as accelerated weathering and age-yellowing. Because imides typically become fluid only at temperatures near or above the reasonable processing limits of PVC, adequate melt blending of imides into PVC is a critical process. Processing at temperatures as high as possible to facilitate intimate blending, yet as low as possible to limit thermal degradation, creates a narrow "window" for processing variables, and recycling of polymer processed at such elevated temperatures causes the recycled polymer, heated for an excessive time as a result of the recycling, to show overt or latent signs of thermal degradation.

Use of lower temperatures to avoid thermal degradation results in the presence of relatively large particles of the imide dispersed throughout the polymer. The larger particles may appear as visible specks or as visibly apparent domains of different refractive index, neither of which are esthetically acceptable, and even if the particles are not visible, they offer discontinuities in the polymer structure to facilitate the propagation of cracks, which results in markedly degraded impact resistance, even in the presence of impact modifiers.

Interpolymerization is a known process for achieving intimate blending of otherwise immiscible polymers. For example, Gallagher, U.S. Pat. No. 3,929,933, teaches "suspension-emulsion interpolymers" of PVC and acrylic polymers as a way of intimately dispersing rubbery polymer particles with PVC to improve the impact resistance of the resulting interpolymer. However, neither this nor other references suggest such a polymerization technique might be useful with imide polymers.

Hornbaker et al, U.S. Pat. No. 4,458,046, discloses PVC blended with styrene-maleimide copolymers to increase resistance to heat deformation and flame resistance. These blends, however, suffer from the problems of other imide-PVC blends described above.

An object of the present invention is to produce a modified polyvinyl chloride having improved heat distortion, impact and processing properties. Another object of the invention is to provide a process by which the physical property improvement attributable to polyimides may be imparted to polyvinyl chloride. Still another object of the present invention is to produce a modified polyvinyl chloride from which vinyl chloride monomer may be removed readily. Other objects of the present invention will be apparent from the following disclosure.

THE INVENTION

We have discovered that interpolymers of polyvinyl chloride and imide polymers may be produced by polymerizing vinyl chloride in the presence of a polyimide. The resulting interpolymers have shown an improved balance of such properties as heat distortion resistance, impact resistance and processing characteristics, when compared with vinyl chloride homopolymer or with conventional melt blends of polyvinyl chloride with physical-property improvers, including polyimides.

DETAILED DESCRIPTION OF THE INVENTION

The process by which the PVC-imide interpolymers are prepared comprises polymerizing vinyl chloride monomer in the presence of a polyimide, an initiator, and optionally other modifiers and other monomers capable of being copolymerized with vinyl chloride. Water, a suspending agent and optionally a co-solvent may also be present in the preferred suspension or solution polymerizations, but these may be absent if bulk polymerization is employed.

Elevated temperatures are preferred to initiate the polymerization reaction; the temperature should be high enough to activate the polymerization initiator, yet low enough to avoid excessive decomposition of the polymer. Although suitable temperatures for the polymerization may readily be selected by one skilled in the art, a preferred temperature range is from about 45° C. to about 75° C., and a more preferred range is from about 50° C. to about 60° C. and more preferably to about 55° C.

The pressure will depend upon the reaction temperature; as the vinyl chloride is preferably maintained as a liquid during the reaction, and as the vapor pressure of the vinyl chloride monomer will be greater than atmospheric pressure at the preferred temperatures of the process, the pressures which occur during the reaction will be greater than atmospheric. Typical pressures which may be observed are initially about ten atmospheres, but as the vinyl chloride monomer is polymerized during the course of the reaction, the pressure may fall to half the initial value, or lower. This fall in the pressure is most noticeable after more than about half of the vinyl chloride has been polymerized.

Preferred polymerization initiators are free-radical initiators having half-lives on the order of a few hours at 50° C. With such initiators more than 90% of the monomer will be polymerized within the range of about four to about ten hours using the preferred reaction temperature range. Preferred initiators include, but are not limited to, peroxydicarbonates, such as di(sec-butyl)peroxydicarbonate, di(2-ethylhexyl)peroxydicarbonate and di(t-butylcyclohexyl)peroxydicarbonate, peroxides such as lauroyl peroxide, benzoyl peroxide and acetyl cyclohexylsulphonyl peroxide, nitriles such as azodiisobutyronitrile and azobis(2,4-dimethylvaleronitrile), and similar initiators, including t-butyl perpivalate.

Suspending agents for the reaction may include, but are not limited to, cellulose derivatives such as hydroxymethyl and hydroxyethyl cellulose, methyl cellulose, sodium carboxyethyl cellulose and hydroxypropyl methyl cellulose, polymers such as poly(vinyl alcohol), poly(vinyl acetate), poly(vinylpyrrolidone), polyacrylates and ethylene/maleic anhydride copolymers, and such other agents as gum arabic and gelatin. One skilled in the art will readily select a suitable suspending agent for suspension polymerization.

Polyimides are well known in the art. The term polyimide, as used herein, includes polymers having imido linkages in the polymer backbone and those having the imide structure attached to a carbon-carbon polymer backbone. Aromatic and aliphatic polyimides are included, as are polyetherimides and analogous polyimides having other linkages, as for example sulfones, in place of oxygen linkages in the polyetherimides. The term polyimide includes polymer blends containing one or more kinds of imide units, copolymers containing one or more kinds of imide units, graft polymers containing one or more kinds of imide units and imidizable polymers which are only partially imidized.

Examples of specific polyimides useful in this invention include polyglutarimide, polymaleimide, polyitaconimide, and the like. The polyimides particularly useful in the present invention are those in which any acid and anhydride groups formed on the polymer chain as byproducts of the imidization process have been largely or completely eliminated. If such groups are present in the polyimide as made they may be eliminated or reduced by such processes as esterification; examples of eliminating or reducing the acid and anhydride groups are given in copending application U.S. Ser. No. 770,034 filed Aug. 27, 1985, and hereby incorporated into the present specification by reference. Although up to about 2%, by weight, of total acid and anhydride functionality, calculated as methacrylic acid and methacrylic anhydride, respectively, may remain in the polyimide, the preferred polyimides contain less than about 0.5 weight percent, and more preferably less than about 0.2 weight percent, of total free acid and anhydride functionality, calculated as methacrylic acid and methacrylic anhydride, respectively.

The polyimides useful in the present invention are not limited to one particular method of preparation, but as an example a polyglutarimide may be prepared by continuously feeding poly(methyl methacrylate) to an extruder equipped with at least one pair of screws, each member of the pair rotating in a direction opposite that of the other member. Ammonia, or a primary amine such as methylamine, is continuously introduced to the extruder through an injection port, and unwanted byproducts and excess ammonia or amine are removed by progressively reducing the pressure at downstream extruder vents. Typical conditions for preparing such a polyglutarimide are an operating pressure of 20–60 atmospheres, an average extruder barrel temperature of 200°–300° C. and a vacuum of 0.1–0.2 atmosphere applied to the downstream extruder vent.

Where necessary, elimination of acid and anhydride groups from the polyimide is similarly not limited to any particular method, but by way of example a polyimide such as the polyglutarimide prepared above may be continuously introduced to a similar twin-screw extruder, and an esterifying agent such as trimethylorthoformate similarly introduced through an injection port at a rate that produces a slight excess of the esterifying agent above the stoichiometric amount required to remove the acid and anhydride functionality present in the polyimide. Operating conditions for the extruder would be similar to those given above for preparation of the polyimide. Additional preparation of polyimides is described by Kopchik, U.S. Pat. No. 4,246,374, hereby incorporated by reference into the present specification.

The levels at which the polyimide may be incorporated with the polyvinylchloride into an interpolymer range from a PVC-polyimide ratio of from about 49:1 to about 1.5:1, by weight; a more preferred range is from about 32:1 to about 1.9:1, by weight and a still more preferred range is from about 19:1 to about 2.3:1, by weight. As the polyimide level is increased about a PVC-polyimide ratio of about 9:1, by weight, the compatibility of the polyimide with the polyvinyl chloride may be preserved by adding a processing aid or modifier. One particular class of modifiers which is useful for maintaining compatability between the polyimide and the polyvinyl chloride is the acrylic impact modifiers, rubbery polymers which may be incorporated in finely divided form, typically as emulsions, into the polymerization mixture. The ratio of polyimide to modifier to polyvinyl chloride must be adjusted to impart the desired properties to the interpolymer. The suitable ratio may be readily selected by one skilled in the art.

A phenomenon which we discovered in the course of preparing the interpolymers of this invention was that incorporation of the polyimide into the PVC by interpolymerization increased the level of undesirable, residual vinyl chloride monomer present in the resulting PVC product even following conventional removal steps for the residual monomer. We have further discovered that incorporation of finely divided particulate solids, preferably polymeric solids, into the interpolymer permits significant reduction of the residual vinyl chloride monomer levels.

The process by which the residual vinyl chloride monomer level may be reduced comprises polymerizing the vinyl chloride monomer in the presence of the polyimide and the finely divided particulate solids, and subsequently subjecting the resulting interpolymer to a residual-monomer-removal step. Such a step is well known, and is conventionally applied to PVC; it may include steam stripping, sparging with air or nitrogen, solvent extraction and the like. Preferred finely divided particulate solids which may be incorporated into the interpolymer are those which are insoluble or only sparingly soluble in the materials present during interpolymerization, although the solids may be swollen by the monomers; particularly preferred are polymeric solids such as acrylic or styrenic polymers. By finely divided is generally meant materials whose particle size is smaller than one micrometer. The finely divided particulate solid may be present at levels from less than 1% by weight, based on the total weight of PVC-imide interpolymer and finely divided solids, to about 40% by weight, on the same basis, or even greater levels, especially if the solid is also contributing to other desirable properties of the interpolymer. An example of such a solid is the acrylic impact modifiers discussed above. These modifiers are well known in the art, and may be produced, for example, by emulsion polymerizing a lower alkyl ester of acrylic acid with a small amount of polyethylenically unsaturated crosslinking monomer.

Other modifiers which may optionally be added to the reaction mixture when preparing the interpolymer of the present invention include acrylic impact modifiers, methacrylate-butadiene-styrene and acrylonitrile-butadiene-styrene impact modifiers, processing aids, lubricating aids, processing aids that also serve as lubricating aids, and flame retardants. The particular modifiers to use would be selected readily by those skilled in the art, based on a knowledge of such modifiers for conventional PVC.

PVC-imide interpolymers may be prepared over a wide range of PVC molecular weights, including the high molecular weights suitable for vinyl siding and pipe, the intermediate molecular weights suitable for bottle manufacture, and the lower molecular weights suitable for injection molding.

The difficulty of dispersing polyimide in blends with low-molecular-weight PVC is well known to those skilled in the art. At a given degree of processing, dispersion of polyimide in the interpolymer of polyimide with low-molecular-weight PVC is significantly better than the dispersion achieved with a blend of the polyimide with a similar low-molecular-weight PVC.

The PVC-imide interpolymers posses highly useful properties that differ significantly from conventional melt blends of PVC with imides. Without wishing to be bound to the following theory, applicants speculate that the interpolymerization produces some degree of graft-linking between the polymers, which is not seen in the melt-blended polymers. Even in the absence of graft-linking, the vinyl chloride monomer appears to swell the particles of imide, allowing vinyl chloride to polymerize within the particles and promoting a high degree of homogeneity. It is thought that this homogeneity, by eliminating the discontinuities present in conventional melt blends of PVC and polyimide, contributes significantly to impact resistance and weatherability of the PVC-polyimide interpolymers.

EXAMPLES

The following examples are intended to illustrate the present invention, and not to limit it, except as it is limited in the claims. Unless otherwise noted, all percentages are by weight and all reagents are good commercial grade.

Vicat softening temperatures given in the following examples were determined according to ASTM Standard Method 1525-65T at a penetration depth of 1.0 mm (0.040 inch). The molecular weights were determined by gel permeation chromatography, using a poly(methylmethacrylate) molecular-weight standard. Sag measurements were performed on 15.25×1.27×0.23-cm (6×0.5×0.09-inch) strips cut from molded polymer samples clamped horizontally, 10 cm (4 inches) from the measurement end, and placed in an oven at the indicated temperature. After 30 minutes the deflection of the measurement end of the strip from horizontal, in centimeters, was measured and recorded for each strip.

EXAMPLE 1

This example illustrates the preparation and isolation of a methyl-esterified polyglutarimide/poly(vinyl chloride) interpolymer by suspension polymerization.

To a 6-liter reactor equipped with a steam jacket were added about 2 liters deionized water, about 3 g of a 75% solution of di(sec-butyl)peroxydicarbonate in mineral spirits as an initiator, 60 g of a 4% aqueous solution of hydroxymethyl cellulose polymer as a suspending agent, and 64 g, equivalent to about 8% of the total polymer/monomer mixture, of methyl-esterified polyglutarimide, 81% imidized, having no measurable acid and anhydride functionality, a 160° C. Vicat softening temperature by ASTM Standard Method 1525-65T, and weight-and number-average molecular weights of $1.3 \times 10^5$ and $5.8 \times 10^4$ grams/mole, respectively. The reactor was purged with several volumes of nitrogen to eliminate atmospheric oxygen, and then sealed. About 700 g of vinyl chloride monomer was added with stirring at about 275 rpm. The reactor was quickly heated to about 50° C., and then heated at the rate of about 2° C. per hour to a maximum of 60° C.; it was held at that temperature until about two hours after the characteristic pressure drop that signals polymerization of a major amount of the vinyl chloride monomer. The reactor was then cooled and vented through a charcoal adsorbent filter, and the polymer contents were air dried to a powder having the same appearance as a PVC homopolymer.

EXAMPLE 2

This example illustrates the preparation of another methyl-capped polyglutarimide/poly(vinyl chloride) interpolymer by suspension polymerization, the preparation involving a different imide polymer.

The procedure of Example 1 was repeated, except that the polyglutarimide used was a methyl-esterified polyglutarimide having weight- and number-average molecular weights of $6.6 \times 10^4$ and $2.6 \times 10^4$ grams/mole respectively, no measurable acid and anhydride functionality and an imidization level of about 70%, prepared from a feedstock comprising one part poly(ethyl acrylate) and 99 parts poly(methyl methacrylate). The isolated, dried product closely resembled the product obtained in Example 1.

EXAMPLE 3

This example illustrates, for comparative purposes, an attempt to prepare by suspension polymerization polyglutarimide/poly(vinyl chloride) interpolymer containing free acid and/or anhydride groups.

The procedure of Example 1 was repeated, using the corresponding unesterified imide (precursor imide to that used in Example 1), containing 6.4 weight percent free carboxylic acid and 0.2% free anhydride and having a 170° C. Vicat softening temperature. The resulting polymer had poor physical properties.

EXAMPLE 4

The procedure of Example 1 was repeated by reacting 240 g polyglutarimide having number-and weight-average molecular weights of $6.6 \times 10^4$ and $2.6 \times 10^4$ grams/mole respectively, no measurable acid and anhdryide functionality and about 70% imidization, 170 g of poly(n-butylacrylate) crosslinked with 1% trimethylolpropane triacrylate, in the form of a 40% solid, aqueous emulsion, and 490 g of vinyl chloride monomer, the polyimide being about 49% by weight of the vinyl chloride charge, to produce an interpolymer containing approximately 36% polyimide.

EXAMPLE 5

The procedure of Example 1 was repeated by reacting 80 g of a methylmethacrylate/N-lauryl maleimide copolymer containing about 18% of the imide with 740 g vinyl chloride monomer to produce an interpolymer containing about 10% polymaleimide, based on the weight of vinyl chloride interpolymerized with the imide.

EXAMPLE 6-10

Using the procedure of Example 1, vinyl chloride monomer was interpolymerized with the polyglutarimides of Examples 1 or 2, as indicated in Table I below, in the presence of an acrylic impact modifier (AIM), to produce the interpolymers of Examples 6, 7 and 9. As controls, the polyimide and AIM were physically blended with PVC to produce a blend having the same proportions of polyimide, AIM and PVC as the corresponding interpolymer (Examples 8 and 10). The AIM used in the interpolymerized examples was a copolymer of butyl acrylate with 1% trimethylolpropane triacrylate, emulsion polymerized to a particle size of about 80 nanometers (nm). The AIM used in the blended examples employs the same butyl acrylate copolymer as the core of a core-shell emulsion particle of approximately the same size, having a hard outer shell of poly(methyl methacrylate) which is 30% of the total weight of modifier. For the interpolymer examples the AIM was added as an emulsion to the reactor containing polyimide prior to adding the monomer and polymerizing it, while for blending the AIM paticles were isolated from the emulsion and added to the polyimide and PVC. The core-shell particles are analogous to the poly(butyl acrylate) copolymer of the interpolymer examples, but the core-shell form greatly facilitated isolation of the particles from the emulsion.

The resulting polymers were tested for Vicat softening temperature and sag as described above, for notched Izod impact resistance according to ASTM Standard Method D-256, and for dispersion, either by visual examination of a molded polymer sample that was milled to a smooth surface, or by scanning electron micrography (SEM).

Results of the notched Izod impact test were reported as the percentage of samples exhibiting a ductile or hinged break, as opposed to a clean, brittle break. Visual inspection rated the appearance of the samples for homogeneity of the surface, i.e., absence of visible regions of inhomogenous materials. The scanning electron micrography uses backscattered (high energy) electrons that cause regions of PVC to appear light and regions of polyimide to appear very dark. The homogeneity of the photomicrographs was evaluated similarly to those of the visual samples.

The compositions and results of these tests are shown in Table I below.

TABLE I

| Example | Composition | Vicat Softening Temperature (°C.) | Sag at 185° C. (cm) | Notched Izod Impact (% Ductile Breaks) | Dispersion (Method) |
| --- | --- | --- | --- | --- | --- |
| 6 | Ex 2 Imide - 10% AIM 8% PVC 82% Interpolymerized | 95 | 0.48 | 100 | Good (Visual) |
| 7 | Ex 2 Imide - 8.4% AIM 8.0% PVC 83.6% Interpolymerized | 94 | 1.25 | 78 | Good (Visual) |
| 8 | Ex 2 Imide - 8.4% AIM 8.0% PVC 83.6% Blended | 93 | 0.25 | 0 | Good (Visual) |
| 9 | Ex 1 Imide - 8% AIM 8% PVC 84% Interpolymerized | 94 | 0.55 | 100 | Good (Visual) (SEM) |
| 10 | Ex 1 Imide - 8% AIM 8% PVC 84% Blended | 92 | 0.43 | 10 | Poor (Visual) (SEM) |

As may be seen from Table I, the homogeneity of the interpolymerized samples, indicated by the notched Izod impact test and the dispersion ratings, is superior to that of the blended samples. The interpolymerized samples showed primarily ductile breaks characteristic of a homogeneous material, while the blended samples, even the one that appeared homogeneous on visual inspection, showed brittle breaks characteristic of a material having inhomogeneous regions that focus stress.

EXAMPLES 11-14

The following examples illustrate the effectiveness of the present invention with lower molecular weight PVC. A chain transfer agent (trichloroethylene) was added to the vinyl chloride monomer mixture prior to polymerization, to reduce the effective molecular weight of the resulting polymer from that suitable for vinyl siding application (K value of about 67, Example 1-10) to that suitable for PVC bottles (K value of about 58) and for injection molding (K value of about 48). The molecular weight of the PVC used in the blended samples was similarly reduced.

K values for such materials relate directly to solution viscosities of the materials, and indirectly to their molecular weights. They were determined according to ASTM Standard Test Method D-1243-66, using 0.5 g polymer dissolved in 100 ml cyclohexanone, and a viscosity measurement temperature of 25° C.

The AIM used in the interpolymers of the following examples was the same as that used in Examples 6, 7 and 9, and the AIM used in the blends was similar to that used in Examples 8 and 10, except that the poly(methyl methacrylate) shell was 25% of the total weight of the modifier. The samples were examined visually for homogeneity as described in Examples 6-10, and the compositions and results are shown in Table II, below.

TABLE II

| Example | Composition | Dispersion |
| --- | --- | --- |
| 11. | Ex 2 Imide - 8.3% AIM 10% PVC (K = 58) 81.7% Interpolymerized | Good |
| 12. | Ex 2 Imide 8.3% AIM 10% PVC (K = 58) 81.7% Blended | Fair |
| 13. | Ex 2 Imide 10% AIM 10% PVC (K = 48) 80% Interpolymerized | Good |
| 14. | Ex 2 Imide 10% AIM 10% | Poor |

TABLE II-continued

| Example | Composition | Dispersion |
|---------|-------------|------------|
|         | PVC (K = 48) 80% Blended | |

Table II illustrates that the enhanced homogeneity of PVC-polyimide interpolymers is seen at low as well as high PVC molecular weights.

EXAMPLES 15-20

The following examples illustrate the effectiveness of incorporating finely divided particulate solids into the interpolymerization reaction of the present invention in facilitating removal of residual vinyl chloride monomer from the resulting interpolymer. Following interpolymerization according to the procedure of Example 1, using as reactants the polyimide of Example 2 and vinyl chloride monomer, with an emulsion copolymer of butyl acrylate and 1% trimethylolpropane triacrylate crosslinker acting as the finely divided particulate solids where indicated, the samples were nitrogen sparged and the residual vinyl chloride monomer level, in parts per million parts of interpolymer, was determined gas chromatographically. The composition of the interpolymers and the results of replicate pairs of residual-monomer determinations are indicated in Table III.

TABLE III

| Example | Composition | Residual Monomer (ppm) |
|---------|-------------|------------------------|
| 15      | Imide - 8% PVC 92% (control) | 18000 2120 |
| 16      | Imide - 8% Particulate Solids 8% PVC - 84% | 30 35 |
| 17      | Imide - 8% Particulate Solids - 8% PVC - 84% | 145 70 |
| 18      | Imide - 10% Particulate Solids -10% PVC - 80% | 55 200 |
| 19      | Imide - 12% Particulate Solids - 8% PVC - 80% | 250 950 |
| 20      | Imide - 30% Particulate Solids - 8% PVC - 62% | 30 100 |

EXAMPLES 21-24

These examples are similar to Examples 15-20, except that the polyimide of Example 1 was used. This is a higher molecular weight polyimide and, without wishing to be bound by the following speculation, we think that this higher molecular weight material interferes with diffusion of the residual vinyl chloride monomer from the interpolymer. As is shown in Table IV, a reduction is seen in the residual monomer level when the particulate solids are added, but this reduction is smaller than that observed with the lower molecular weight polyimide of Example 2. For each pair of data, the first represents residual vinyl chloride monomer determined by gas chromatography using a mass-selective detector, and the second represents residual vinyl chloride monomer by gas liquid chromatography using a flame-ionization detector.

TABLE IV

| Example | Composition | Residual Monomer (ppm) |
|---------|-------------|------------------------|
| 21 (control) | Imide - 8% Particulate Solids - 0% PVC - 92% | 6500 4700 |
| 22 | Imide - 8% Particulate Solids - 8% PVC - 84% | 4200 1230 |
| 23 | Imide - 8% Particulate Solids - 8% PVC - 84% | 4400 1100 |
| 24 | Imide - 8% Particulate Solids - 8% PVC - 84% | — 3900 |

PVC-imide interpolymers may also be made by bulk polymerizing the polyimides with vinyl chloride monomer in the absence of water and a solvent. For example, the polyglutarimide of Example 1 may be used, with the same initiator and amount of vinyl chloride monomer as in that example. The reaction mixture would be heated typically to about 60° C. and held at that temperature for about 6-8 hours to produce the interpolymer.

Another procedure for preparing the PVC-imide interpolymer involves using as a co-solvent a monomer that is an imide capable of copolymerizing with vinyl chloride. An example of such an imide monomer is N-phenyl maleimide. Reactants would include vinyl chloride monomer, a polyimide as described above, and the solvent monomer. Reaction conditions would be similar to those of Example 1. The resulting polymer could be characterized as an interpolymer of the polyimide with a PVC-imide copolymer.

Another alternative for preparing the PVC-imide interpolymer by suspension polymerization is to use a liquid other than water as the suspending medium. For example, the procedure of Example 1 may be repeated, replacing the water with tetrahydrofuran or a similar liquid that will not substantially react with the monomers.

Polymeric processing aids, lubricating aids and/or combined processing and lubricating aids may be added to the reactor prior to a polymerization such as that described in Example 1. The preferred form of these aids is an emulsion, but other forms may be used. Fire retardants and other property modifiers known to those skilled in the art may also be added to the reactor at this time.

In-situ esterification of unesterified polyimides containing free acid and/or anhydride groups is expected to provide yet another practical method of forming the PVC-imide interpolymers. The unesterified polyimide may be added to the vinyl chloride monomer and esterified in-situ by an appropriate alkylating agent; such an agent may readily be selected by one skilled in the art. The resulting mixture may then be added to the reaction vessel with the suspending aid, water and initiator, and the reaction initiated without further addition of vinyl chloride monomer.

We claim:

1. An interpolymer of polyvinyl chloride and a polyimide from which any acid and anhydride groups that may have been formed during imidization have been largely or completely eliminated, in a weight ratio of from about 49:1 to about 1.5:1.

2. The interpolymer of claim 1 wherein the weight ratio of PVC to polyimide is from about 32:1 to about 1.9:1.

3. The interpolymer of claim 1 wherein the weight ratio of PVC to polyimide is from about 19:1 to about 2.3:1.

4. The interpolymer of claims 1, 2 or 3 wherein the polyimide contains glutarimide units.

5. The interpolymer of claims 1, 2 or 3 wherein the polyimide contains N-methyl glutarimide units.

6. The interpolymer of claim 1 wherein any remaining acid and anhydride groups are present at a level of less than about 2% by weight.

7. The interpolymer of claim 1 wherein any remaining acid and anhydride groups are present at a level of less than about 0.5% by weight.

8. The interpolymer of claim 1 wherein any remaining acid and anhydride groups are present at a level of less than about 0.2% by weight.

9. A process for preparing an interpolymer of polyvinyl chloride and polyimide which comprises polymerizing, at elevated temperature, vinyl chloride monomer in the presence of a polyimide from which any acid and anhydride groups that may have been formed during imidization have been largely or completely eliminated and a free-radical initiator.

10. The process of claim 9 wherein the vinyl chloride monomer is suspension polymerized in the presence of the polyimide, the initiator, a suspending agent and a suspending liquid.

11. The process of claim 10 wherein the suspending liquid is water.

12. The process of claim 11 wherein the polyimide contains glutarimide units.

13. The process of claim 11 wherein the polyimide contains N-methyl glutarimide units.

14. The process of claim 9 wherein the elevated temperature is a temperature from about 45° C. to about 60° C.

15. The process of claim 9 wherein the elevated temperature is a temperature from about 50° C. to about 55° C.

16. The process of claim 9 wherein the initiator is a peroxydicarbonate.

17. The process of claim 9 wherein the polyimide contains glutarimide units.

18. The process of claim 9 wherein the polyimide contains N-methyl glutarimide units.

19. The process of claim 17 or 18 wherein the weight ratio of PVC to the polyimide is from about 32:1 to about 1.9:1.

20. The process of claim 17 or 18 wherein the weight ratio of PVC to polyimide is from about 19:1 to about 2.3:1.

21. A process for reducing the amount of residual vinyl chloride monomer present in the PVC-imide interpolymer of claim 1 which comprises the steps of
    (a) interpolymerizing the vinyl chloride monomer and polyimide in the presence of a finely divided, polymeric solid insoluble or only sparingly soluble in any of the other materials present during interpolymerization, and
    (b) subjecting the resulting interpolymer to a residual-monomer-removal step.

* * * * *